(12) United States Patent
Yu et al.

(10) Patent No.: US 6,614,587 B1
(45) Date of Patent: Sep. 2, 2003

(54) CONTROL METHODS FOR A METRO OPTICAL AMPLIFIER

(75) Inventors: Jun Yu, Plano, TX (US); Charles Mao, Plano, TX (US); Jin Xie, Dallas, TX (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/795,789

(22) Filed: Feb. 28, 2001

(51) Int. Cl.[7] .................................. H01S 3/00
(52) U.S. Cl. ..................... 359/337.12; 359/341.41; 359/341.42
(58) Field of Search ....................... 359/337.12, 341.41, 359/341.42

(56) References Cited

U.S. PATENT DOCUMENTS

| | | | | |
|---|---|---|---|---|
| 5,491,548 A | * | 2/1996 | Bell et al. ................. | 250/208.2 |
| 5,699,081 A | * | 12/1997 | Denkin et al. ......... | 359/337.12 |
| 5,828,486 A | * | 10/1998 | Yoshida ..................... | 359/134 |
| 6,304,347 B1 | * | 10/2001 | Beine et al. ................ | 359/110 |
| 6,366,393 B1 | * | 4/2002 | Feulner et al. .............. | 359/337 |
| 2002/0027706 A1 | * | 3/2002 | Park et al. ............. | 359/341.41 |

FOREIGN PATENT DOCUMENTS

KR         2000 52684     *  9/2000

* cited by examiner

Primary Examiner—Thomas G. Black
Assistant Examiner—Deandra M. Hughes
(74) Attorney, Agent, or Firm—Sawyer Law Group LLP (57) ABSTRACT

A reliable and inexpensive method for deploying, operating and maintaining optical amplifiers in a variety of optical networks under a wide range of conditions using channel number reference tables. A preferred embodiment of the current invention may control one or more optical amplifiers or gain blocks operating in a variety of modes such as AGC mode, ALC mode and hybrid AGC/ALC mode without requiring the use of expensive channel counters. Channel number reference tables may be calculated based on initial input optical power output readings and a count of the number of channels initially served by the amplifier. According to the current invention, changes in the number of channels may be monitored and used to control a gain block by monitoring the gain block input optical power output, converting to a gain block voltage and referencing the channel number reference table.

4 Claims, 6 Drawing Sheets

Figure 1

| Voltage Change Window | Number of channels |
|---|---|
| $0 < x \leq 0.15$ | 1 |
| $0.15 < x \leq 0.39$ | 2 |
| $0.39 < x \leq 0.54$ | 3 |
| $0.54 < x \leq 0.65$ | 4 |
| $0.65 < x \leq 0.74$ | 5 |
| $0.74 < x \leq 0.81$ | 6 |
| $0.81 < x \leq 0.93$ | 8 |
| $0.93 < x \leq 1.02$ | 10 |
| $1.02 < x \leq 1.1$ | 12 |
| $1.1 < x \leq$ | 16 |

| Number of Input Channels | Center Voltage | Voltage Window |
|---|---|---|
| 1 | $V_1 = V_o + 0.1*10\text{Log}10[1/\text{NUM}]$ | $V < (V_1+V_2)/2$ |
| 2 | $V_2 = V_o + 0.1*10\text{Log}10[2/\text{NUM}]$ | $(V_1+V_2)/2 < V < (V_2+V_3)/2$ |
| . | | |
| . | | |
| NUM-1 | $V_{num-1} = V_o + 0.1*10\text{Log}10[(\text{NUM}-1)/\text{NUM}]$ | $(V_{num-2}+V_{num-1})/2 < V < (V_{num-1}+V_{num})/2$ |
| NUM | $V_{num} = V_o$ | $(V_{num-1}+V_{num})/2 < V < (V_{num}+V_{num+1})/2$ |
| NUM+1 | $V_{num+1} = V_o + 0.1*10\text{Log}10[(\text{NUM}+1)/\text{NUM}]$ | |
| . | | |
| . | | |
| 16 | $V_{16} = V_o + 0.1*10\text{Log}10[16/\text{NUM}]$ | $(V_{15}+V_{16})/2 < V$ |

The output optical power of the gain block is configured to achieve a targeted power level per channel (Step 300).

The gain block is operated in pseudo-AGC mode wherein the gain of the gain block is calculated and the calculated gain is maintained by controlling the pump laser current (Step 310).

The output optical power of the optical gain block is configured to achieve a targeted power level per channel (Step 350).

Pump laser currents are adjusted based on channel change feedback from Step 250 (Step 360).

CONTROL METHODS FOR A METRO OPTICAL AMPLIFIER

FIELD OF INVENTION

Invention relates to communications, particularly to controlling components in optical communications systems.

BACKGROUND OF INVENTION

The growing need for communications networks supporting high-speed transmission rates has contributed to the rising popularity of optical networks, particularly for applications such as backbone networks. The optical amplifier has increased the maximum span distance between expensive optical to electrical regenerators, making long haul optical networks more affordable. Metropolitan area networks (MANs) and access networks are new markets for the deployment of optical networks due to the high demand for bandwidth, especially by internet users. In long-haul networks, many optical amplifiers may be cascaded to traverse long distances creating concerns regarding the accumulation of channel power differences due to gain fluctuations and the accumulation of optical noise. For this application, the gain flatness requirements for each amplifier is typically very tight. For example, common gain flatness requirements may be in the range of +/−0.5 dB. The accumulation of optical noise in systems can be engineered by specifying the noise figure (NF) and gain of amplifiers. For typical MANs and access networks, the distances spanned by the optical network are much shorter than the distances spanned in long haul networks, so that the gain flatness and noise Figure requirements for amplifiers in the MAN can be relaxed compared to the requirements for a typical long haul network. Amplifiers with relaxed gain flatness and noise figure requirements typically used in MAN and access network applications are often less expensive than amplifiers with tight requirements.

Two common methods for amplifier control include automatic gain control (AGC) and automatic level control (ALC) techniques. AGC techniques are effective for maintaining the gain characteristics of an optical amplifier constant. However, the output power varies with the input power. In contrast, ALC techniques tend to be immune to variations of optical amplifier input power. However, when the number of optical channels changes, the ALC controlling microprocessor must be updated with the number of optical channels. For ALC-only controllers, the typical channel change update is done manually. In general, manual techniques tend to be time-consuming, inconvenient, error-prone and unacceptable to network administrators. To address these problems, expensive channel counters may be deployed to determine the number of channels when using ALC techniques. However, the added expense of a channel counter is typically unacceptable for use in low cost MANs and access networks.

What is needed is a stable, inexpensive and automated method for deploying, operating and maintaining optical amplifiers in a variety of optical networks under a wide range of conditions.

SUMMARY OF INVENTION

It is an object of the current invention to provide reliable and inexpensive methods for deploying, operating and maintaining optical amplifiers in a variety of optical networks under a wide range of conditions.

A preferred embodiment of the current invention may control one or more optical amplifiers or gain blocks operating in a variety of modes such as AGC mode, ALC mode and hybrid AGC/ALC mode without requiring the use of expensive channel counters. According to a preferred embodiment of the current invention, the number of channels may be estimated based on gain block input optical power readings and a channel reference table calculated using the initial number of channels served by the optical amplifier and an initial gain block input optical power.

Advantageously, the current invention enables the simple and inexpensive deployment, operation and maintenance of optical amplifiers or gain blocks in a wide variety of optical network such as MANs and WANs.

DETAILED DESCRIPTION OF PREFERRED EMBODIMENTS

Figure 1:
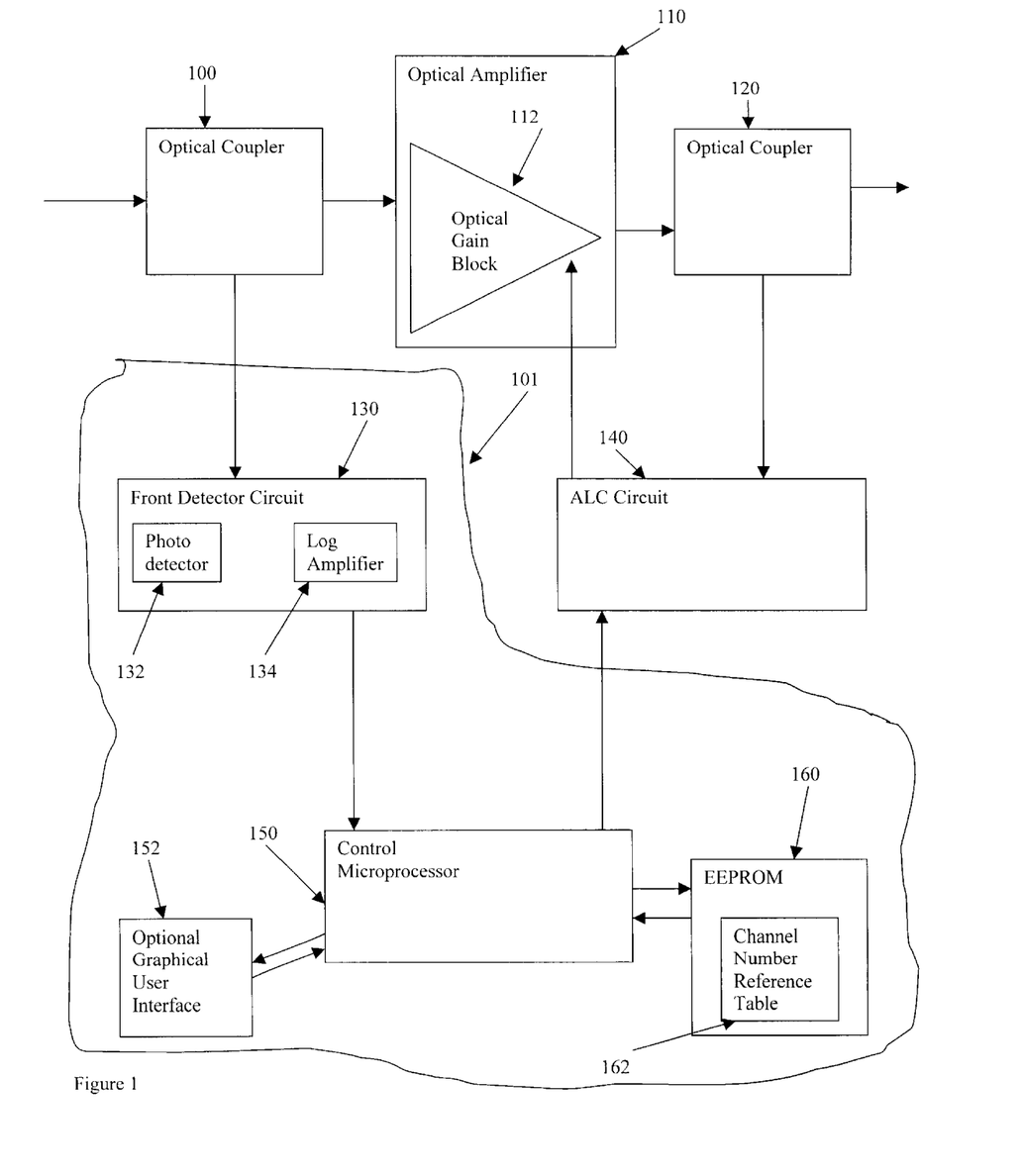
FIG. 1 illustrates a preferred embodiment of the current invention deployed to control an optical gain block in an optical amplifier operating in ALC mode.

FIG. 1 illustrates a preferred embodiment of the current invention 101 deployed to control an optical gain block 112 in an optical amplifier 110 operating in ALC mode. Alternate embodiments of the current invention may be implemented to control one or more optical amplifiers and/or one or more optical gain blocks operating in one or more modes including, but not limited to ALC mode, AGC mode and hybrid ALC/AGC mode. The front detector circuit 130 comprises one or more photo detectors 132 for detecting the gain block input optical power output. Preferably, the front detector circuit 130 further comprises a log amplifier 134 for translating the gain block input optical power output into an initial gain block voltage. In a preferred embodiment of the current invention 101, the output voltage of the log amplifier 134 is configured to cover the dynamic range of the gain block input optical power. For example, a typical gain block input optical power output dynamic range may be 50 dB. In this example, the log amplifier 134 may be configured such that an increase of gain block input optical power by 1 dB results in a typical output voltage increase from the log amplifier 134 of 0.1V.

Figure 2:
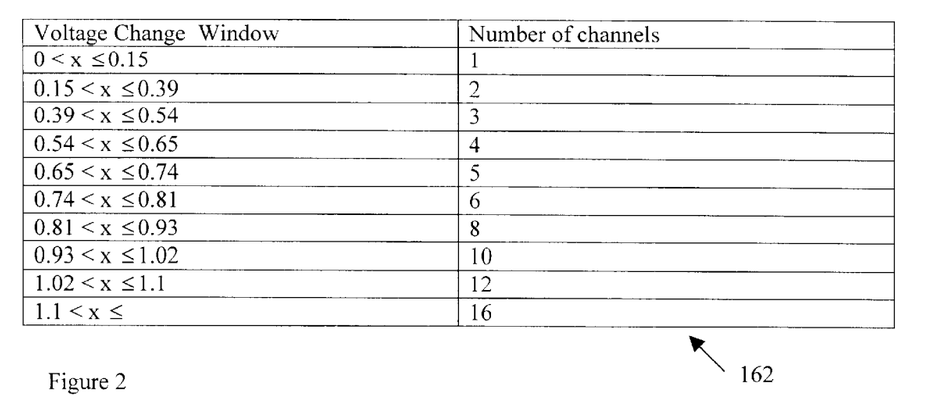
FIG. 2 illustrates a representation of a typical channel number reference table according to a preferred embodiment of the current invention.

One or more channel number reference tables such as channel number reference table 162 are stored in a location that is accessible to the control microprocessor 150. In a preferred embodiment of the current invention 101, the channel number reference table 162 is stored in a memory chip such as an EEPROM, however one or more different memory storage devices may be implemented in alternate embodiments. FIG. 2 illustrates a representation of a typical channel number reference table 162 according to a preferred embodiment of the current invention 101. According to the invention, the channel number reference table 162 is calculated based on the number of channels initially served by the optical amplifier 110 and an initial gain block input optical power reading. Preferably, the current invention 101 is initialized by user input when an administrator, technician or operator inputs a value for the number of channels initially served by the optical amplifier 110. However, alternate embodiments may interface with one or more coupled systems such as a network management and control system for acquiring the value for the number of channels initially served by the optical amplifier 110. Ideally, an optional graphical user interface 152 may be used to interface with the control microprocessor 150. Preferably, the optional GUI 152 may be used for a variety of activities such as initialization of the number of channels initially served by the optical amplifier 110 as well as maintenance and control activities. However alternate embodiments may support additional and/or alternate interfaces comprising one or more programmatic, command line, alternate digital or analog interfaces. Preferably, the value provided as the number of channels initially served by the optical amplifier 10 is exactly equal to the number of channels initially served by the optical amplifier 110. However, in some embodiments of the current invention, the value provided may be approximately equal to the number of channels initially served by the optical amplifier. Alternate embodiments supporting input values approximately equal to the number of channels initially served by the optical amplifier are expected to operate accurately for systems supporting a large number of channels. For embodiments of the current invention controlling more than one optical gain block and/or optical amplifier, additional front detector circuits and controlling circuits may be used and one or more channel reference tables may be created, stored and used.

A preferred embodiment of the current invention 101 operates by repeatedly sampling gain block input optical power with photodetector 132 and converting the gain block input optical power output readings to voltages using a log amplifier 134. According to a preferred embodiment of the current invention, the control microprocessor may then estimate the current number of channels by referencing the channel number reference table and determine if the number of channels has changed. Channel change feedback may then be provided to one or more control circuits such as ALC circuit 140. Typically control circuits may then control optical gain blocks based on updated channel counts.

Figure 3:
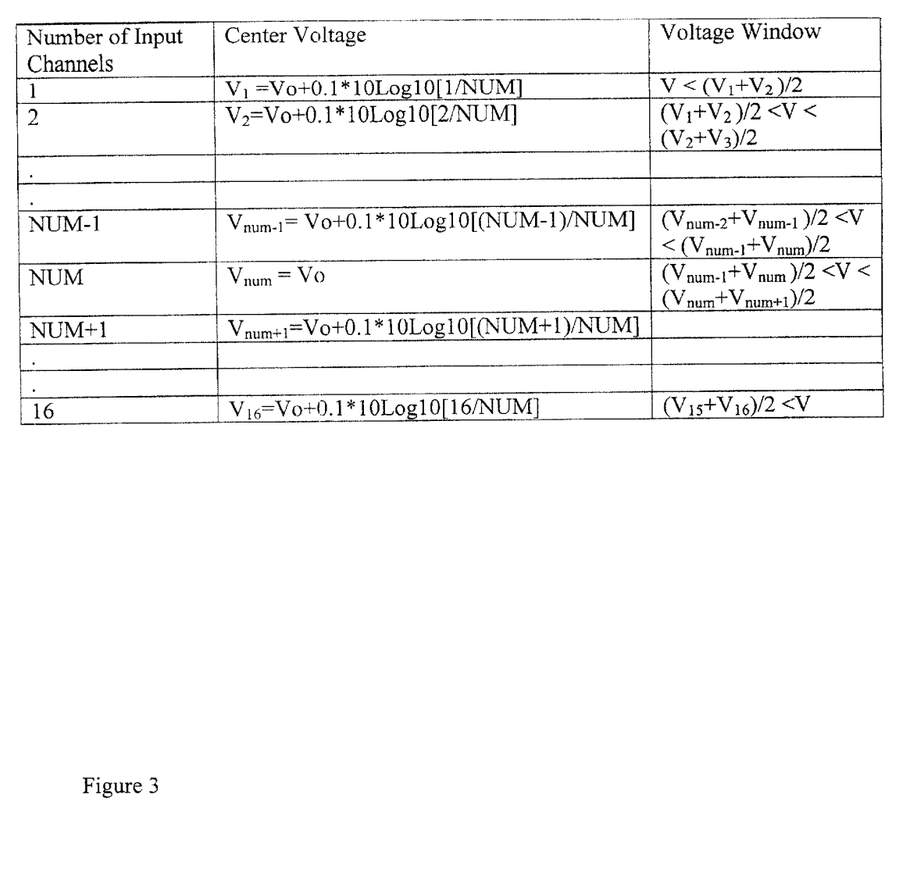
FIG. 3 illustrates a series of calculations done by the control microprocessor to create the channel reference table illustrated in FIG. 2 according to a preferred embodiment of the current invention.

According to a preferred embodiment of the current invention 101, the channel number reference table 162 may be calculated by calculating the center voltage for a voltage window corresponding to a number of input channels, calculating the voltage window and creating a table referencing a voltage window to a number of input channels. In a preferred embodiment of the current invention 101, the channel number reference table 162 is based on an initial gain block input optical power output reading and the input value representing the number of channels initially supported by the amplifier 110. FIG. 3 illustrates a series of calculations done by the control microprocessor 150 to create the channel reference table 162 illustrated in FIG. 2 according to a preferred embodiment of the current invention 101. In FIG. 3, the variable "NUM" corresponds to the number of channels initially served by the optical amplifier 110; the variable $V_{num}$ corresponds to the initial gain block voltage corresponding to the initial input optical power output reading.

In some embodiments of the current invention, a complete channel reference table may be created wherein a voltage window is calculated for every integral number of channels up to a maximum value. However, in a preferred embodiment of the current invention, a subset of the possible voltage windows may be calculated and stored. In this example 162, the voltage window was calculated for every number of channels when the number of channels was small (in this example, one through six). However, for larger numbers of channels (in this example, over six), the voltage windows shrink and it becomes less critical to determine the exact number of channels. For this reason, some alternate embodiments may operate accurately for large numbers of channels even if the value used in the calculation for the number of channels initially supported by the optical amplifier 110 is not an exactly equal to the number of channels initially supported by the optical amplifier. According to a preferred embodiment of the current invention, the channel number reference table 162 may be recalculated at any time. For example, recalculation may be required to support maintenance, reconfiguration or redeployment, such as significant fiber span loss change.

Once the channel number reference table has been calculated, the current invention may be coupled to a control circuit such as ALC circuit 140 and operate to control an operating optical amplifier. A preferred embodiment of the current invention may support operation in one or more modes such as AGC, ALC or hybrid AGC/ALC modes.

According to a preferred embodiment of the current invention, more than one optical gain block and/or more than one optical amplifier may be controlled according to the current invention. In some cases, an optical amplifier may comprise more than one optical gain block. For example, an optical amplifier may comprise two or more optical gain blocks in series. Typically, each individual gain block would be coupled to a unique front detector circuit and one or more unique controller circuits. However one or more gain blocks or optical amplifiers may be controlled using the same control microprocessor. Similarly, multiple channel reference tables corresponding to two or more gain blocks and/or optical amplifiers may be stored in the same storage device.

Various elements of the current invention may be implemented in hardware, firmware and/or software. For example, the front detector circuit 130 may comprise hardware elements such as different kind of electrical amplifier after the photo detector. The control microprocessor 150 may comprise firmware and/or software elements such as a table manager for storing, retrieving and updating one or more reference tables 162.

Figure 4:
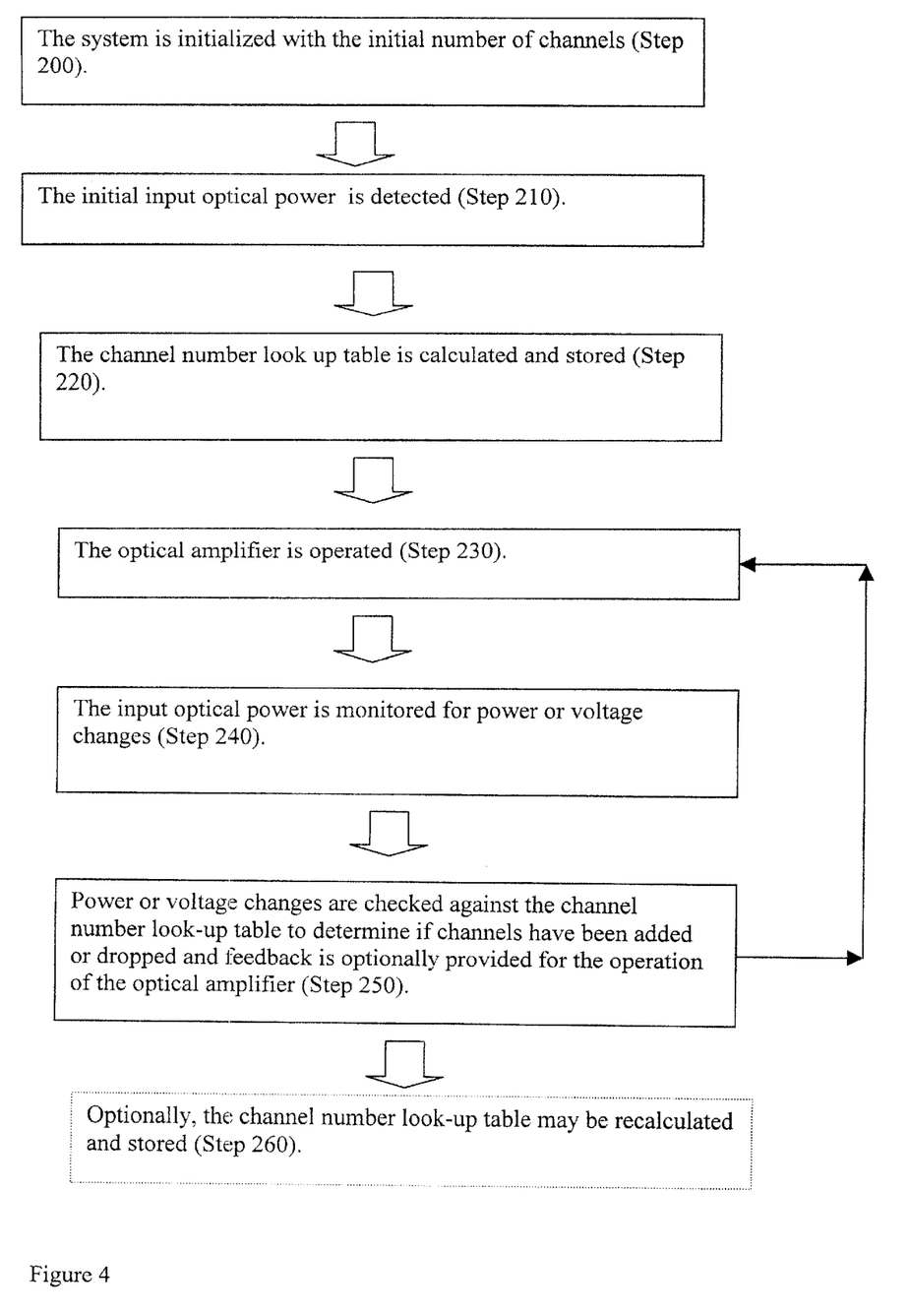
FIG. 4 illustrates a method of control for a gain block in an optical amplifier according to the invention.

FIG. 4 illustrates a method of control for an optical gain block according to the invention. The method begins when the system is initialized with the initial number of channels (Step 200). Preferably, the initial number of channels used for this initialization step is equal to the number of channels initially served by the optical amplifier. However, in alternate methods according to the invention, the system may be initialized with an initial number of channels that is approximately equal to the number of channels initially served by the optical amplifier, For systems serving a large number of channels, the alternate method of using an approximate number of channels during the initialization step may not adversely influence the operation of the invention. The method continues when the initial gain block input optical power output is detected (Step 210). Typically, this step would be achieved using one or more photo detectors. The method continues when the channel number reference table is calculated and stored (Step 220). The method continues when the optical gain block is operated (Step 230). The optical gain block may be operated in one or more modes. For example, the gain block may be operated in AGC, ALC, AGC/ALC hybrid and/or other modes. The gain block input optical power output is monitored for power changes (Step 240). Gain block optical power readings are converted to gain block voltages and are checked against the channel number reference table to estimate the number of channels in order to determine if channels have been added or dropped is provided for the operation of the optical amplifier (Step 250). For example, some methods for operating the optical amplifier may use the number of active channels to control one or more lasers coupled to the optical amplifier. Optionally, the channel number reference table may be recalculated and stored (Step 260).

Figure 5:
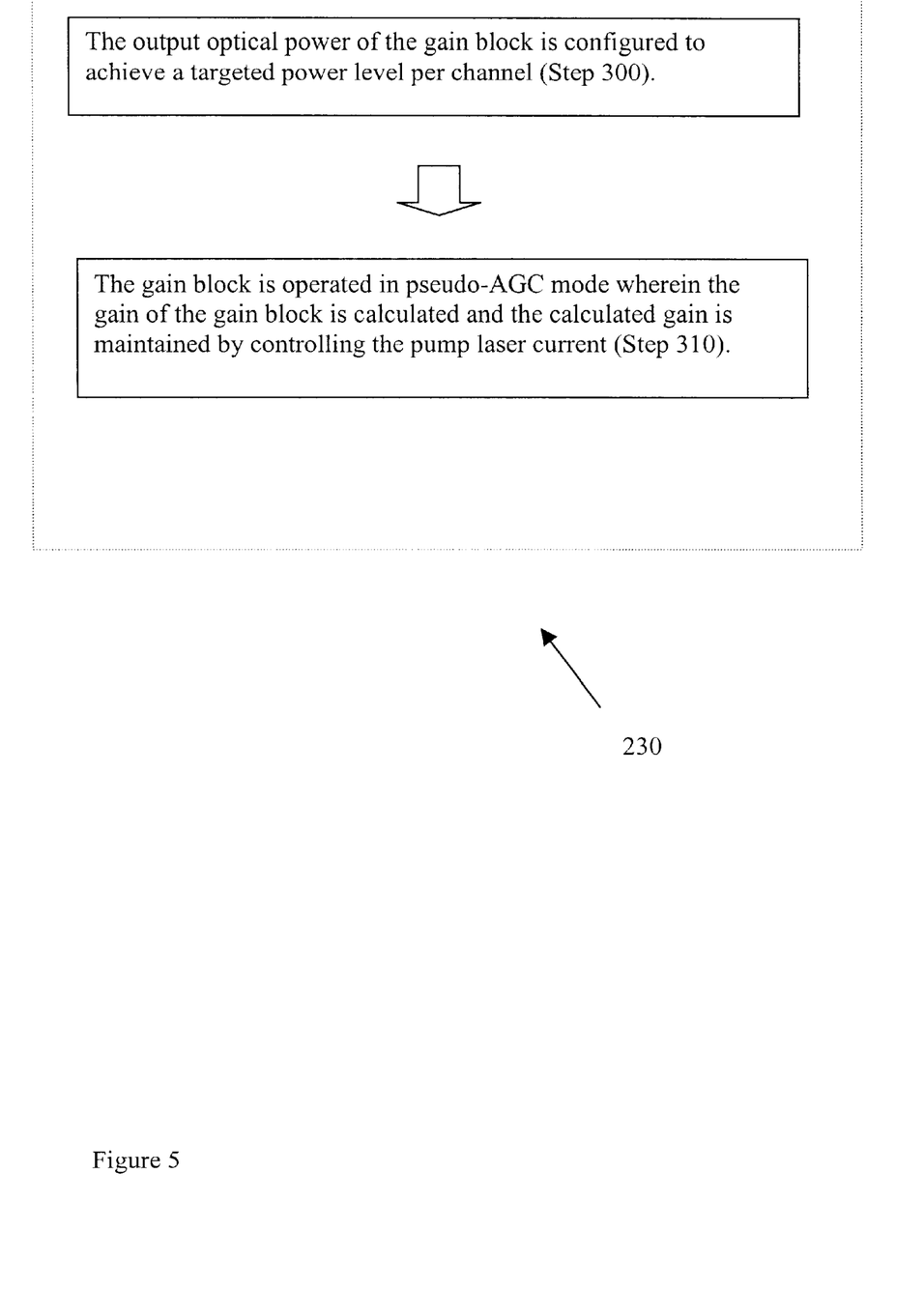
FIG. 5 illustrates one method for operating an optical amplifier or gain block controlled according to the invention.

FIG. 5 illustrates one method for operating an optical gain block controlled according to the invention. In this example, the method for operating an optical gain block controlled according to the invention begins when the output optical power of the optical gain block is configured to achieve a targeted power level per channel (Step 300). For some systems, a typical target power level would be 1 dBm per channel. The method continues when the gain block is operated in pseudo-AGC mode wherein the gain of the optical gain block is calculated and the calculated gain is maintained by controlling a pump laser current (Step 310). In contrast with traditional AGC-only or ALC-only methods, the initial set-up and operation for this method according to the current invention is done in an ALC-style mode followed by operation in an AGC-style mode.

Figure 6:
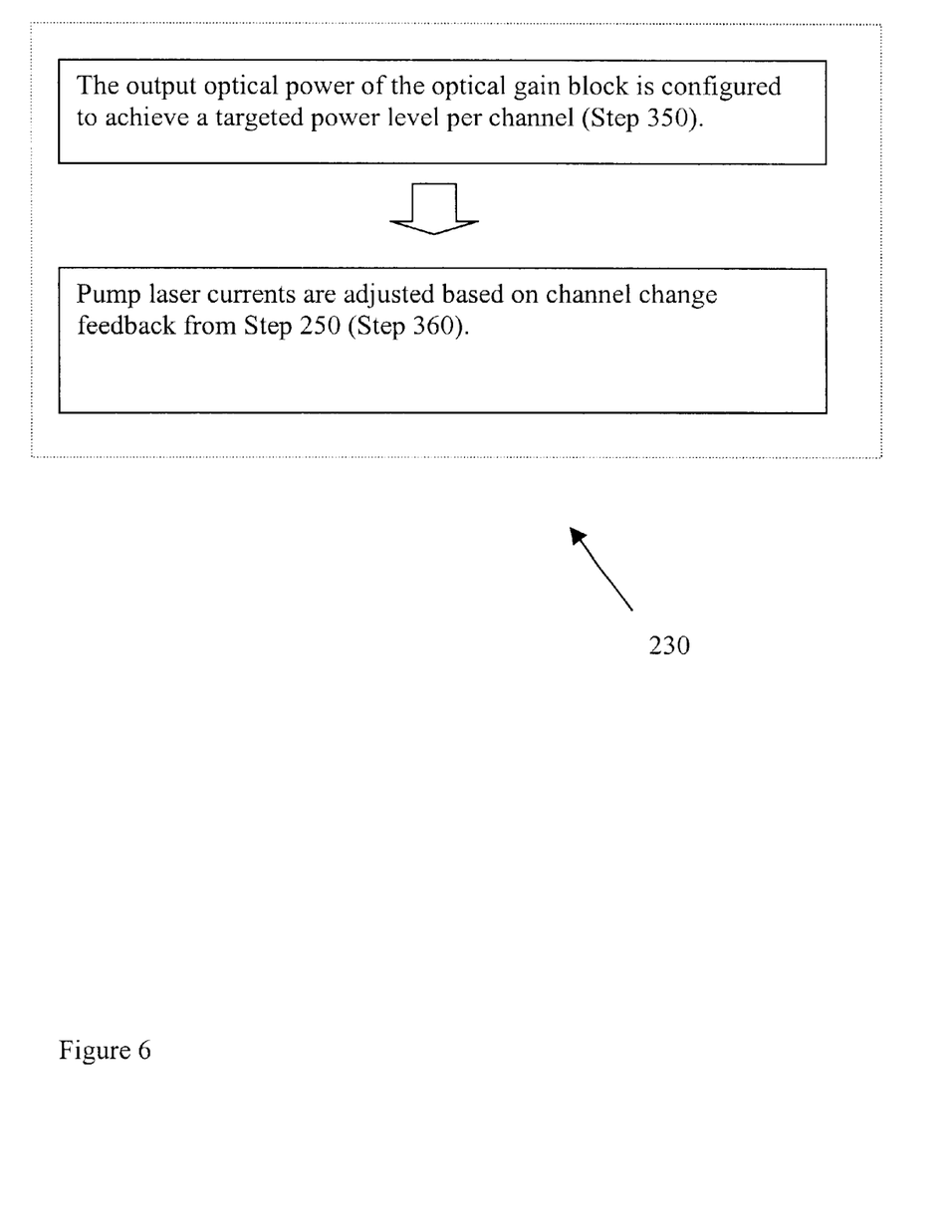
FIG. 6 illustrates a second method for operating an optical amplifier or gain block controlled according to the invention.

FIG. 6 illustrates a second method for operating an optical gain block controlled according to the invention. In this example, the method for operating an optical gain block controlled according to the invention begins when the pump laser current is adjusted so that a targeted optical output power level is maintained (Step 350). For some systems, a typical target power level would be 1 dBm per channel. The method continues when pump laser currents are adjusted based on channel change feedback from Step 250 (Step 360). The advantage of this method over traditional optical amplifier control methods is that no expensive channel counter is required. Furthermore, the output optical power per channel is steady compared to typical AGC controlled amplifiers. Furthermore, channels may be dropped and added without requiring manual intervention without the disadvantages of an AGC controlled amplifier.

The foregoing described embodiments of the invention are provided as illustrations and descriptions. They are not intended to limit the invention to precise form described. In particular, the Applicant contemplates that functional implementation of invention described herein may be implemented equivalently in hardware, software, firmware, or other available functional components or building blocks. Also, the process steps describing the methods may be re-arranged and/or re-ordered. Other variations and embodiments are possible in light of above teachings, and it is thus intended that the scope of invention not be limited by this Detailed Description, but rather by Claims following.

What is claimed is:

1. A flexible, cost-effective method for controlling an optical gain block in an optical amplifier coupled to a control microprocessor and one or more front detectors comprising the steps of:

identifying a value for the number of channels initially served by said optical amplifier;

detecting the initial gain block input optical power and converting said initial gain block input optical power to an initial gain block voltage with one or more of said one or more front detectors, wherein one or more of said one or more front detectors comprises one or more log amplifiers;

calculating the channel number reference table with said control microprocessor based on said initial gain block voltage and said value for the number of channels initially served by said optical amplifier and storing said channel number reference table;

operating said optical gain block;

monitoring said gain block input optical power, converting said gain block input optical power into a gain block voltage with one or more of said one or more front detectors and relaying the updated gain block voltages to said control microprocessor;

repeatedly checking said updated gain block voltages against said channel number reference table with said control processor to estimate the number of channels and determine if channels have been added or dropped;

providing channel change feedback to said control microprocessor; and controlling said optical gain block according to said channel change feedback, wherein said gain block is configured to achieve a target power level per channel.

2. A flexible, cost-effective method for controlling an optical gain block in an optical amplifier coupled to a control microprocessor and one or more front detectors comprising the steps of:

identifying a value for the number of channels initially served by said optical amplifier;

detecting the initial gain block input optical power and converting said initial gain block input optical power to an initial gain block voltage with one or more of said one or more front detectors;

calculating the channel number reference table with said control microprocessor based on said initial gain block voltage and said value for the number of channels initially served by said optical amplifier and storing said channel number reference table, wherein the step of calculating said channel number reference table comprises the steps of:

identifying a set of one or more integers corresponding to one or more possible values for the number of input channels, calculating the center voltages for the voltage windows corresponding to said integers in said set according to the algorithm comprising:

$$V_i = V_{\text{initial number of channels}} + 0.1 * 10 \text{Log} 10 [i/\text{initial number of channels}]$$

wherein i corresponds to one of said one or more integers, $V_i$ corresponds to said center voltage corresponding to said integer i, initial number of channels corresponds to said value for the number of channels initially served by said optical amplifier, and $V_{\text{initial number of channels}}$ corresponds to said initial gain block voltage, calculating upper limits for said voltage windows wherein the upper limit corresponding to i input channels is $(V_i + V_{i+1})/2$, calculating lower limits for said voltage windows wherein the lower limit corresponding to i input channels is $(V_i + V_{i+1})/2$;

operating said optical gain block;

monitoring said gain block input optical power, converting said gain block input optical power into a gain block voltage with one or more of said one or more front detectors and relaying the updated gain block voltages to said control microprocessor;

repeatedly checking said updated gain block voltages against said channel number reference table with said control processor to estimate the number of channels and determine if channels have been added or dropped;

providing channel change feedback to said control microprocessor; and controlling said optical gain block according to said channel change feedback, wherein said gain block is configured to achieve a target power level per channel.

3. An apparatus for controlling one or more optical gain blocks in an optical amplifier comprising:

one or more control microprocessors for calculating and referencing one or more channel number reference tables and providing channel change feedback to one or more control circuits;

one or more front detector circuits for detecting the gain block input optical power for one of said optical gain blocks coupled to one of said one or more optical gain blocks and one or more said one or more control microprocessors, wherein each of said optical gain blocks is configured to achieve a targeted power level per channel; and one or more storage devices coupled to one or more of said one or more control microprocessors for storing one or more of said one or more channel number reference tables, wherein one or more of said one or more channel number reference tables are calculated based on taking the initial gain block voltage and the initial number of channels served by one of said one or more optical amplifiers and estimating the number of channels that correspond to a gain block voltage range wherein said initial gain block voltage is based on the initial gain block input optical power and said gain block voltage is based on the gain block input optical power.

4. An apparatus for controlling one or more optical gain blocks in an optical amplifier comprising:

one or more control microprocessors for calculating and referencing one or more channel number reference tables and providing channel change feedback to one or more control circuits;

one or more front detector circuits for detecting the gain block input optical power for one of said optical gain blocks coupled to one of said one or more optical gain blocks and one or more said one or more control microprocessors, wherein each of said optical gain blocks is configured to achieve a targeted power level per channel, wherein one or more of said one or more front detector circuits comprise one or more log amplifiers; and one or more storage devices coupled to one or more of said one or more control microprocessors for storing one or more of said one or more channel number reference tables.

* * * * *